United States Patent [19]

Mackes et al.

[11] Patent Number: 5,124,708
[45] Date of Patent: Jun. 23, 1992

[54] RF STABILITY MEASURING SYSTEM FOR MTI RADARS

[75] Inventors: David C. Mackes; Franklin B. Jones, both of Catonsville, Md.

[73] Assignee: The United States of America as represented by the Secretary of the Air Force, Washington, D.C.

[21] Appl. No.: 661,031

[22] Filed: Feb. 25, 1991

[51] Int. Cl.$^5$ .............................................. G01S 7/40
[52] U.S. Cl. .................................... 342/174; 342/194
[58] Field of Search ................................. 342/174, 194

[56] References Cited

U.S. PATENT DOCUMENTS

| | | | |
|---|---|---|---|
| 3,701,153 | 10/1972 | Gagliardi et al. | 342/174 |
| 4,768,035 | 8/1988 | Thurber et al. | 342/194 |
| 4,783,660 | 11/1988 | Pierce | 342/101 |
| 4,851,853 | 7/1989 | Mahoney | 342/174 |
| 4,931,800 | 6/1990 | Ward | 342/162 |
| 4,940,985 | 7/1990 | Taylor, Jr. et al. | 342/174 |

*Primary Examiner*—Gilberto Barrón, Jr.
*Attorney, Agent, or Firm*—Irwin P. Garfinkle; Donald J. Singer

[57] ABSTRACT

The disclosed system comprises a testing system which measures the stability of a moving target indicator radar transmitter. It automatically measures the imperfections of its internal in-phase (I)/quadrature (Q) demodulator, and it consists of a control computer, a synchronizer, a frequency synthesizer, an IQ demodulator, a low noise amplifier and a waveform recorder. A unit under test is inserted across the test set for measurement and calibration. The system set has the following features: (a) An automatic calibration routine that requires a tunable RF source. This source provides the RF drive to the UUT. (b) A discontinuous analog to digital (A/D) sample clock that has a precise controllable relationship with the RF pulse. The A/D sample clock samples only during the presence of the RF. (c) A method for computing stability using a table of amplitude and phase weighting coefficients and pulse positions. This table is generated by the user and any desired combination of values is possible. The discontinuous sample clock is used in the acquisition of the raw stability data. During data collection, the computer commands the synchronizer to output a pulse train. The pulse train contains pulses with various pulse widths and pulse repetition frequencies. The synchronizer output turns on the UUT causing it to provide an RF output signal. The synchronizer also sends out bursts of pulses that make the waveform recorder digitize and I and Q video signal from the low noise amplifier. Under the control of the computer, the synthesizer generates two RF signals. One RF signal is applied to the UUT and the other RF is applied directly to the IQ demodulator where the two signals are compared. The IQ demodulator provides the I and Q signal inputs to the low noise amplifier.

4 Claims, 3 Drawing Sheets

TIME INTERVAL A IS USER CONTROLLABLE

CANCELLATION TABLE MENU

TABLE NAME: DEFAULT

| PULSE # | AMPLITUDE WEIGHT | PHASE WEIGHT |
|---|---|---|
| 1. 1 | 1.00000 | 1.00000 |
| 2. 2 | 1.00000 | 1.00000 |
| 3. 3 | 1.00000 | 1.00000 |
| 4. 0 | 0.00000 | 0.00000 |
| 5. 0 | 0.00000 | 0.00000 |
| 6. 0 | 0.00000 | 0.00000 |
| 7. 0 | 0.00000 | 0.00000 |
| 8. 0 | 0.00000 | 0.00000 |
| 9. 0 | 0.00000 | 0.00000 |
| 10. 0 | 0.00000 | 0.00000 |

CHOOSE FROM THE FUNCTION KEYS BELOW.

| STEP ENTRY | SET PULSE | SET AMP WT | SET PHA WT | READ CANCEL | CAT CANCEL | STORE CANCEL | PURGE CANCEL | NEXT PAGE | DONE CANCEL ■ |

FIG. 3

CALIBRATION AND STABILITY MENU

CURRENT STATUS: WAITING

OPERATING FREQUENCY: 5.40000 GHz

CURRENT SEQUENCE: CAL_SEQ

CURRENT CANCELLATION TABLE: DEFAULT

CURRENT STABILITY REFERENCE MODE: 1    PULSE: 4    SAMPLE: 2

USE DATA BELOW NOISE LEVEL: NO

CHOOSE FROM THE FUNCTION KEYS BELOW.

| SET | CATALOG | SET | SELECT | SELECT | SELECT | AQUIRE | COMPUTE | N MASK | DONE |
| SEQ | | SEQ | FREQ | MODE | PULSE | SAMPLE | DATA | STAB | OFF | STABIL |

FIG. 4

RF STABILITY MEASURING SYSTEM FOR MTI RADARS

STATEMENT OF GOVERNMENT INTEREST

The invention described herein may be manufactured and used by or for the Government for governmental purposes without the payment of any royalty thereon.

This invention relates to a stability test set for testing the moving target indicator (MTI) stability of radar transmitters under changing mode conditions, automatically, and with precision and flexibility. The disclosed unit automatically measures the imperfections of its internal IQ demodulator and this information is used to correct the raw stability data used in the stability computation. The RF amplifier's stability can be calculated in a virtually unlimited number of ways specified by a user supplied table. The unit acquires stability data only when RF is present, thereby conserving digitizer memory space.

BACKGROUND OF THE INVENTION

The performance of ground based moving target indicator (MTI) radars depends heavily on the stability of the transmitter. A spectrally pure STALO signal will be degraded by its passage through a high power RF amplifier. If the transmitted signal is not stable enough, the radar's ability to reject ground clutter and returns from stationary objects will be degraded. The uniformity of each pulse allows the radar to reject such clutter and stationary returns. The object of this invention is to test whether the transmitted signals of a unit under test meet the rigid specifications of modern MTI radars.

Modern radars rely heavily on multiple coherent pulses for reduction of clutter. This has become more important in the case of military radars due to the development of "stealth" targets with small radar cross sections which must be detected and tracked through heavy clutter, which can be much larger that the signal.

The use of Moving Target Indicator (MTI) circuitry to cancel clutter continues from the early days of radar to this day, although today it is more flexible and accurate. In a conventional MTI radar, pulses received from the target are delayed in time until the arrival of a second pulse, and then the first delayed pulse is subtracted from the second pulse. The clutter, which is stationary, is thus canceled and the target appears. The amount of cancellation of clutter is called the cancellation ratio CR, defined as: CR=(Clutter in)/(Clutter out). When signal integration schemes are used to gain additional detection, this becomes the Improvement Factor (IMF): IMF=(Signal Out)/(Signal IN) =CR Subclutter visibility is another term used. It is the size target detectable below clutter, expressed as a ratio (in db). While suitable for comparing radar systems, it is dependent on target type and fluctuation, clutter type, false alarm rate, probability of detection, and threshold levels. Therefore, 2 pulse cancellation ratios are a better transmitter stability benchmark.

Clutter Ration (CR) is limited by the degree that transmitted pulses do not perfectly replicate. When a transmitter power supply changes from pulse to pulse, this produces phase and amplitude modulations in the signal, thus degrading CR. Ripple is another cause. In addition, radars have tended toward multimode operation, where the pulse parameter are changed continuously, based on the operational scenario encountered. This is to optimize the radar signal for the type of target in each beam position. Also, the overall power radiated must be minimized to reduce prime power consumption and intercept of radar signals.

These modes require different duty cycles and pulse repetition frequencies, which can cause transmitter power supply fluctuations much larger than the expected power line ripple. DC power supply feedback loops can be too slow to respond to mode changes.

In the past, MTI stability was measured by two primary methods. The first is a delay line pulse cancellation procedure that subtracts the detected versions of the present RF pulse and a delayed version of a previous RF pulse. The method requires a lossy delay line that may distort the delayed pulse's amplitude and phase properties. Other problems with this method are that the exact delay time is hard to control and the range of usable delays is limited by loss considerations. This measurement procedure indicates only how the amplitude difference of the two pulses varies with time.

The second method for testing MTI stability measures both amplitude and phase variations by having the user adjust the phase relationship between the RF and local oscillator (LO) ports of a double balanced mixer. If the RF and LO are in phase, the mixer acts as an AM detector. A 90 degree phase difference between the ports causes the mixer to be a PM detector. Sometimes two sets of mixers and phase shifters are used to permit measurement of AM and PM variations simultaneously. There are at least two problems with this method. First, precision phase shifters are narrow band devices as far as their tuning range and bandwidth are concerned, and second, it is difficult to adjust the phase shifters to the exact 0 or 90 degree points.

SUMMARY OF THE INVENTION

The present invention was designed to test the MTI stability of radars under the foregoing changing mode conditions, automatically and with precision and flexibility. The present invention discloses a testing device which measures the moving target indicator stability of transmitters. The test set is designed to automatically measure the imperfections of its internal in-phase (I)/- quadrature (Q) demodulator. The testing device comprises a control computer, a synchronizer, a frequency synthesizer, an IQ demodulator, a low noise amplifier and a waveform recorder. A unit under test is inserted across the test set for measurement and calibration. The control computer is connected by a control bus to the waveform recorder, the synchronizer, the frequency synthesizer, and the IQ demodulator. The synchronizer is connected to the waveform recorder and the IQ demodulator. The IQ demodulator is connected to the low noise amplifier which in turn is connected to the waveform recorder. The test set has the following features:

a: An automatic calibration routine that requires a tunable RF source. This source provides the RF drive to the unit under test (UUT).

b. A discontinuous analog to digital (A/D) sample clock that has a precise controllable relationship with the RF pulse. The A/D sample clock samples only during the presence of the RF.

c. A method for computing stability using a table of amplitude and phase weighting coefficients and pulse positions. This table is generated by the user and any desired combination of values is possible.

In operation, the discontinuous sample clock is used in the acquisition of the raw stability data. During data collection, the computer commands the synchronizer to output a pulse train. The pulse train contains pulses with various pulse widths and pulse repetition frequencies. The synchronizer output turns on the UUT causing it to provide an RF output signal. The synchronizer also sends out bursts of pulses that make the waveform recorder digitize the I and Q video signal from the low noise amplifier. Under the control of the computer, the synthesizer generates two RF signals. One RF signal is applied to the UUT and the other RF is applied directly to the IQ demodulator where the two signals are compared. The IQ demodulator provides the I and Q signals to the low noise amplifier.

PRIOR PATENTS

The following U.S. Patents were found in a search of the prior art;

U.S. Pat. No. 3,701,153 issued to Gagliardi teaches a radar testing device for clutter, wherein a histogram is formed of each of the signals which shows the amplitude of the received signals as a function of the frequency. The histogram is then stored for further evaluation of radar performance.

U.S. Pat. No. 4,768,163 issued to Thurber teaches a radar wherein the IF signal is sampled by an A/D converter which provides I and Q signals to first and second MTI filters. The MTI outputs from the MTI filters are combined to produce data sampling.

U.S. Pat. No. 4,783,660 issued to Pierce teaches a system for reducing amplitude, frequency and phase distortion by averaging transmitter pulses and obtaining a plurality of filter coefficients. The filters provide outputs which have reduced distortions.

U.S. Pat. No. 4,851,853 issued to Mahoney teaches a signal processing technique for reducing distortion by applying weighting to transmitter signal samples.

U.S. Pat. No. 4,931,800 issued to Ward teaches a moving target detector which uses corrected weighting coefficients to compensate for pulse stagger effects on transmitted pulses. No prior art was uncovered which teaches the MTI stability system disclosed herein.

The disclosed test set has several novel features:

1. An automatic calibration routine that requires only a turntable RF signal source. This source provides the RF drive to the MTI radar Unit Under Test (UUT).

2. A discontinuous analog to (A/D) sample clock that has a precise and controllable relationship with the RF pulse. The A/D samples only during the time when RF is present so that the memory in the digitizer is conserved.

3. A method for computing stability using a table of amplitude and phase weighing coefficients and pulse positions. This table is generated by the user and any desired combination of values is possible. The user can also control the reference point of a stability computation.

DESCRIPTION OF THE DRAWINGS

FIG. 3 is a cancellation table menu; and

FIG. 4 is a calibration stability menu.

DESCRIPTION OF THE PREFERRED EMBODIMENT

Figure 1:
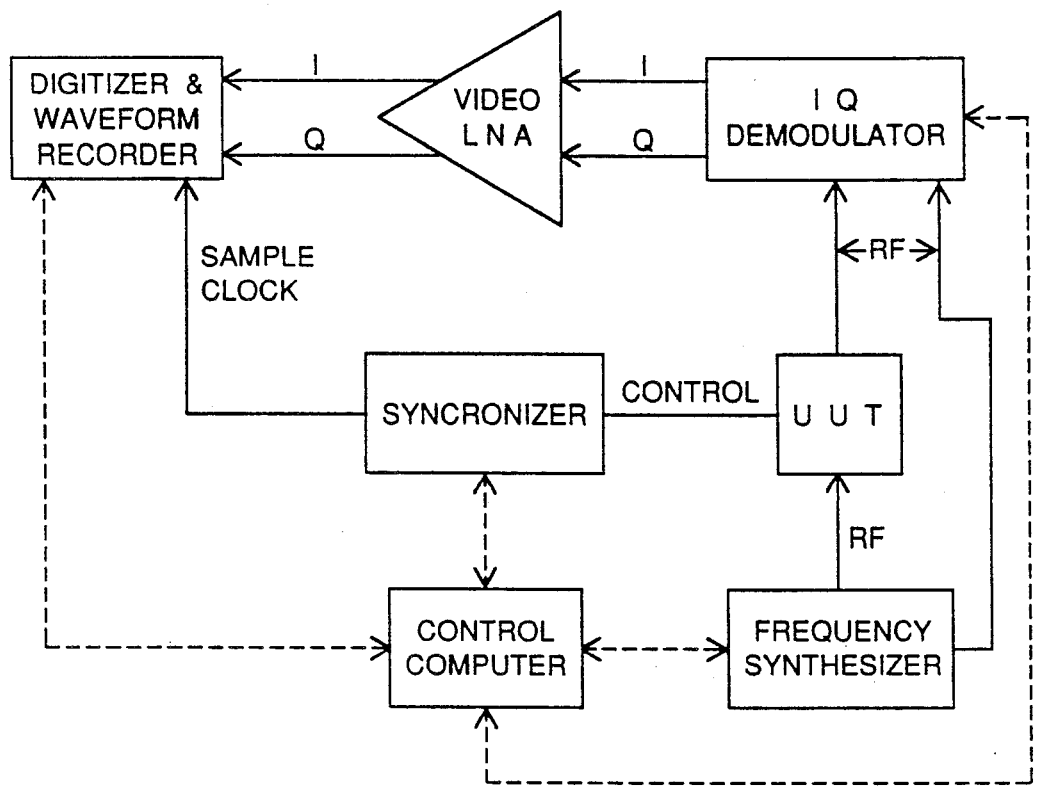
FIG. 1 is a block diagram of a preferred embodiment of the invention.

Referring to FIG. 1, the system is arranged to determine whether a particular radar unit under test, the UUT, is within the design specifications required for the particular mission. The UUT is driven by a frequency synthesizer, the RF frequency of which is under the control of a control computer. The output of the UUT and the synthesizer are applied to the inputs a and b, respectively, of IQ demodulator. During Step 1 of the calibration process, the computer steps the frequency of the UUT lower with respect to the calibration frequency. The detected I and Q outputs from the demodulator are DC voltages which vary as a function of the RF frequency applied at input terminals a and b. The computer continues to step the frequency lower until detection of a positive going zero crossing voltage in the output I of the In Phase channel of the demodulator. In Step 2, the computer steps the frequency higher than the calibration frequency until detection of a negative going zero crossing at the zero crossing in the In Phase output I of the demodulator. In Step 3, the computer causes the output frequency of the synthesizer to sweep from the lower frequency to the higher frequency. While the frequency sweep is taking place, the signals at the I and Q outputs from the demodulator are amplified through a Low Noise Video Amplifier and then applied to a digitizer which digitizes the video outputs. After recording in the waveform recorder, the digitized information is applied to the computer for storage in data arrays.

If the IQ demodulator was perfect, plotting the data collected during the sweeping of the frequency during step 3 would show one cycle of a sine wave for the I channel and a plus or minus cosine wave for the Q channel. This is not the case in a practical IQ demodulator because it has DC offsets and amplitude and phase imbalance. The computer uses the data gathered in step 3 to compute (1) the DC offset in each channel, (2) the channel imbalance and (3) the quadrature error. The computations are made in accordance with the following equations:

$$DC\ OFFSET = (|Vmax| - |Vmin|)/2$$

$$Vpeak = Vmax - DC\ OFFSET$$

$$CHANNEL\ IMBALANCE = VpeakQ/VpeakI$$

The computer then determines the quadrature error by finding the number of digitized data points between the negative going zero crossings in the I and Q channels data, after DC offset removal. Since the number of points in one cycle is known, the number of points between negative going zero crossings can be converted to phase angle:

N = Number of points in 360 degrees (or the number of data points between zero crossings);

N/4 = Number of points for a 90 degree angle;

X = Number of points between I and Q negative going zero crossings.

Therefore:

$$Quadrature\ Error = [(N/4)-X] * [360/N] degrees.$$

Figure 2:
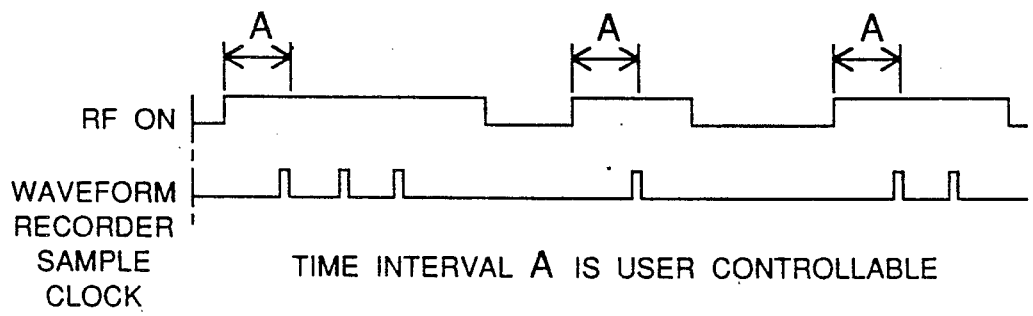
FIG. 2 is a series of curves showing the synchronizer outputs.

In summary, a discontinuous sample clock is used in the acquisition of raw stability data. During data collection, the computer issues a command to a synchronizer which outputs a pulse train. The pulse train contains pulses with various pulse widths and pulse repetition frequencies. The output of the synchronizer controls the UUT, causing it to turn on and output RF to the IQ Demodulator. The synchronizer also sends out burst of pulses that make the waveform recorder digitize the I and Q video signals. The relationship between the pulse burst and the RF control signal is shown in FIG. 2. The user controls the length of time of interval A. This permits measurement of perturbations instability due to transmitter initial turn on transients. Using a discontinuous sample clock conserves waveform recorder memory, permitting measurement of longer pulse sequences.

Stability is defined as the variation of the amplitude and phase of the comparison value with respect to the amplitude and phase of the reference point. The amplitude and phase of the comparison value are computed by using the cancellation table and stability tables shown in FIGS. 3 and 4. The following example shows how the computer calculates stability based on the tables.

Let:
$I(X,Y,Z), Q(X,Y,Z)$ = the measured and corrected values for sample Z of pulse Y in mode X.
$AMPWT(N)$ = amplitude weight of entry N in the cancellation table.
$PHAWT(N)$ = phase weight of entry N in the cancellation table.
$AMP(X,Y,Z) = SQRT(I(X,Y,Z)^2 + Q(X,Y,Z)^2)$
$PHA(X,Y,Z) = ARC\ TAN\ (Q(X,Y,Z)/I(X,Y,Z))$ where the angle can vary from 0 to 360 degrees.
Ref amp = AMP (1,4,2)
Ref Phase = PHA (1,4,2)
Comp Amp = (Amp(1,3,2) * AMPWT(1) + Amp(1,2,2) * AMPWT(2) + Amp(1,1,2) * AMPWT(3))/3
Comp Phase = (Pha(1,3,2) * PHAWT(1) + Pha(1,2,2) * PHAWT(2) + Pha(1,1,2) * PHAWT(3))/3

Note that the comparision value is a weighted average formed by using I and Q data values and parameters from the cancellation table. Also note that the Pulse number used in the comp amp and comp phase equations is given by $CPN(X)$ = stability reference pulse number - $PN(X)$ Where
$PN(X)$ = the pulse number for entry X of the cancellation table.
AM stability = 20 * log (1 - ((Ref amp - Comp amp)/Ref amp))
PM stability = 20 * log (Ref phase - Comp Phase)/Ref phase))

The reference point for the next iteration of computation is: Mode = 1, Pulse = 5 and Sample = 2. The process repeats until the reference point reaches the end of the sequence, passing through each mode. The user can also terminate the computation at any time.

While I have shown an exemplary embodiment of this invention, it is intended that its scope be limited only by the following claims as interpreted in the light of the prior art.

What is claimed is:

1. In a system for calibrating the stability of an MTI radar unit under test, said system including a frequency synthesizer, an IQ demodulator having first and second input terminals and first and second output terminals, a synchronizer, a waveform recorder and a control computer for controlling the operation of said system in accordance with a user program, said frequency synthesizer supplying RF to said unit and to one input terminal of said IQ demodulator, the RF output of said unit being supplied to the other input terminal of said IQ demodulator;

means, under the control of said computer generating sync pulses from the output of said synchronizer, said sync pulses enabling said unit under test, said frequency synthesizer and said waveform recorder, the method, under the control of said computer, comprising the steps of:

a. stepping up the synthesizer RF output to said unit from a lower frequency to a higher frequency until a positive going zero crossing is detected in the I output of said IQ demodulator;

b. stepping down the synthesizer RF output to said unit from said higher frequency to said lower frequency until a negative going zero crossing is detected in the I output of said IQ demodulator;

c. sweeping the synthesizer RF output to said unit from the lower frequency to the higher frequency;

d. during step c, digitizing the I and Q outputs of said IQ demodulator and storing such digitized information in said computer;

e. calculating the quadrature error in said computer in accordance with the following equation:

Quadrature Error = $[(N/4) - X]$ * $(360/N)$ degrees where:
N = the number of points in 360 degrees, and
X = the number of points between the I and Q negative going zero crossings.

2. The method of claim 1, wherein prior to calculating said quadrature error, computations are made in said computer to calculate (1) DC offset between the voltages measured in the I and Q channels, and (2) the I and Q channel imbalance, in accordance with the following equations:

DC Offset = $(|Vmax| - |Vmin|)/2$

Vpeak = Vmax - DC Offset, and

Channel Imbalance = $VpeakQ/VpeakI$.

3. The method of claim 1 wherein the period of generation of the RF applied to said IQ demodulator is controlled by said computer.

4. The method of claim 3 wherein the outputs of said IQ demodulator are digitized and stored in said computer only during the periods of generation of said RF pulses applied to said IQ demodulator.

* * * * *